United States Patent [19]

Mauchan

[11] Patent Number: 5,181,059
[45] Date of Patent: Jan. 19, 1993

[54] CAMERA ADAPTOR KIT

[75] Inventor: Donald E. Mauchan, Marlborough, Mass.

[73] Assignee: Polaroid Corporation, Cambridge, Mass.

[21] Appl. No.: 642,850

[22] Filed: Jan. 18, 1991

[51] Int. Cl.$^5$ .................. G03B 15/03; G03B 17/24
[52] U.S. Cl. .................. 354/108; 354/126; 354/145.1; 354/295
[58] Field of Search ........... 354/105, 108, 126, 145.1, 354/295, 106, 107, 109, 141

[56] References Cited

U.S. PATENT DOCUMENTS

| | | | |
|---|---|---|---|
| 3,998,541 | 12/1976 | Michaloski | 355/11 |
| 4,717,930 | 1/1988 | Wheeler | 354/108 |
| 4,833,493 | 5/1989 | Lamar | 354/107 |
| 4,855,770 | 8/1989 | Mauchan | 354/75 |
| 4,896,176 | 1/1990 | Barrett | 354/122 |

Primary Examiner—L. T. Hix
Assistant Examiner—J. K. Han
Attorney, Agent, or Firm—Alfred E. Corrigan

[57] ABSTRACT

A camera having a flash for illuminating an object to be photographed includes a film cassette inside the camera housing. A template is located within the film cassette to overlie a stack of film units during their sequential exposure. The template includes an opaque section with transparent portions to cause an identifying indicia to be produced on any resulting photograph. A reflector is mounted on the camera outside of the field of view of its objective lens and intermediate the flash and the object to be photographed, to reflect a portion of the light from the flash back through the camera lens to impinge on the template. The result, in the developed film unit, is increased contrast in the section of the photograph underlying the template between the opaque and transparent portions.

10 Claims, 5 Drawing Sheets

CAMERA ADAPTOR KIT

BACKGROUND OF THE INVENTION

1. Field of the Invention

This invention relates to a kit for use with a camera to imprint indicia on a film unit when it is exposed.

2. Description of the Prior Art

For various reasons it is often desirable for the owner to be able to identify the source of photographs. The "source" in this context may mean the location where the photograph was taken, the person taking the photograph, the owner, or the commercial entity supplying the photograph.

A specific example of why a photograph might be labeled with the indica of the supplier is in commercial real estate. A potential buyer or lessee may be working with a plurality of real estate personnel from diverse real estate agencies. The customer might have a plurality of photographs of suitable locations from each of the various realtors. However, after a period of time the customer may forget which realtor supplied him with a given photograph. This could create problems for both the real estate agent and the customer in formalizing a final arrangement. Where the source is identified on the photograph the problem will not exist.

Numerous other problems of this kind are apparent to any casual observer of commercial or artistic representations made by photographs. Accordingly, there is a need to label the individual photographs with names or other indicia at the time the photographs are presented for consideration. Obviously, this can be done by stick-on labels, writing on the back of the photograph or other means, but these are time consuming, inconvenient and often forgotten.

The need is to have an automatic identification logo printed directly on the face of the photograph at the time the film unit is exposed and that has been done. An example is discussed in U.S. Pat. No. 4,717,930 which discloses mounting a template to overlie the dark slide of a film pack inside a camera. The only internal change in structure is the overlying template. The template itself is transparent with opaque indicia. Thereby it screens one part of the underlying film unit from light entering the lens while exposing the remainder of the film unit. The patent discloses an additional structural unit, external of the camera, which is mounted in front of a source of artificial illumination and channels light in a particular way into the camera. Its purpose is to modify the background portion of the photograph surrounding the object to be photographed.

Another manner for providing a film edge logo, copyright notice, or other desired indicia is disclosed in U.S. Pat. No. 4,833,493 which provides a template overlying the film unit and a light path which directs light around a conventional dark slide before it impinges on the template. The template itself is a slide which is secured to a film holder and the ambient light bypasses the dark slide to expose a specific area along one edge of the film unit.

U.S. Pat. No. 4,896,176 discloses a kit comprised of a template for imprinting indicia on an instant film unit and a reflector mounted in the field of view of the camera's lens for directing a portion of the light from a flash unit back into the camera's lens.

A problem which exists with a structure using an indicia bearing template is that the opaque portion of the template blocks a part of the underlying film unit and that creates a dark or unexposed section in the resulting photograph. In order for the indicia to be visible within this dark section it is necessary to expose (or overexpose) that portion of the film unit by using light passing through the lens at the time of the opening of the shutter. Where the portion of the film unit recording the reflected light from the subject being photographed is from an area which is itself dark, e.g., black street pavement, the intensity of the image light which penetrates the transparent indicia of the template may be too low. As a result, the indicia in the photograph may not contrast well with the surrounding background and may be unintelligible.

What is needed is a mechanism for insuring that adequate light passes through the lens to properly expose the template area and insure that the indicia is recorded on the film unit with sufficient contrast vis-a-vis the non-exposed area of the film unit.

SUMMARY OF THE INVENTION

This invention discloses an improved and superior apparatus for providing the improved indicia on each successive film unit. To accomplish this result, a template is located in superposition with a film unit in a film cassette and a light reflector is mounted on the front of the camera.

The template for this invention is manually positioned in the film cassette prior to its insertion into a camera and the film units themselves will be separated from the template by a conventional dark slide, which dark slide is removed only after the film pack is in operative position within a lighttight camera housing.

The camera involved with this invention is a conventional self-developing or instant camera and it includes a shutter, a lens, a source of artificial light, and a film loading door.

A light reflector is mounted on the camera forward of both the lens and the source of artificial light and between the lens and the object to be photographed. The reflector is mounted on the front of the camera at a location outside the field of view of the objective lens, but within the field illuminated by the source of artificial light, and the reflector is so located and configured as to reflect some of the light from the source of artificial illumination to the lens. Thus, the light from the reflector, in addition to the light from the scene, causes exposure of portions of the film unit underlying the transparent portions of the template defining the logo or indicia even though the area in question, in the lens viewing field, may be dark.

An object of the invention is to provide a kit for adapting a camera for use in producing a film unit having indicia at a lower end of the image therein, which indicia is clearly discernible against its background.

Other objects of the invention will in part be obvious and will in part appear hereinafter.

The invention comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be taken in connection with the accompanying drawings wherein.

DETAILED DESCRIPTION OF THE INVENTION

Figure 1:
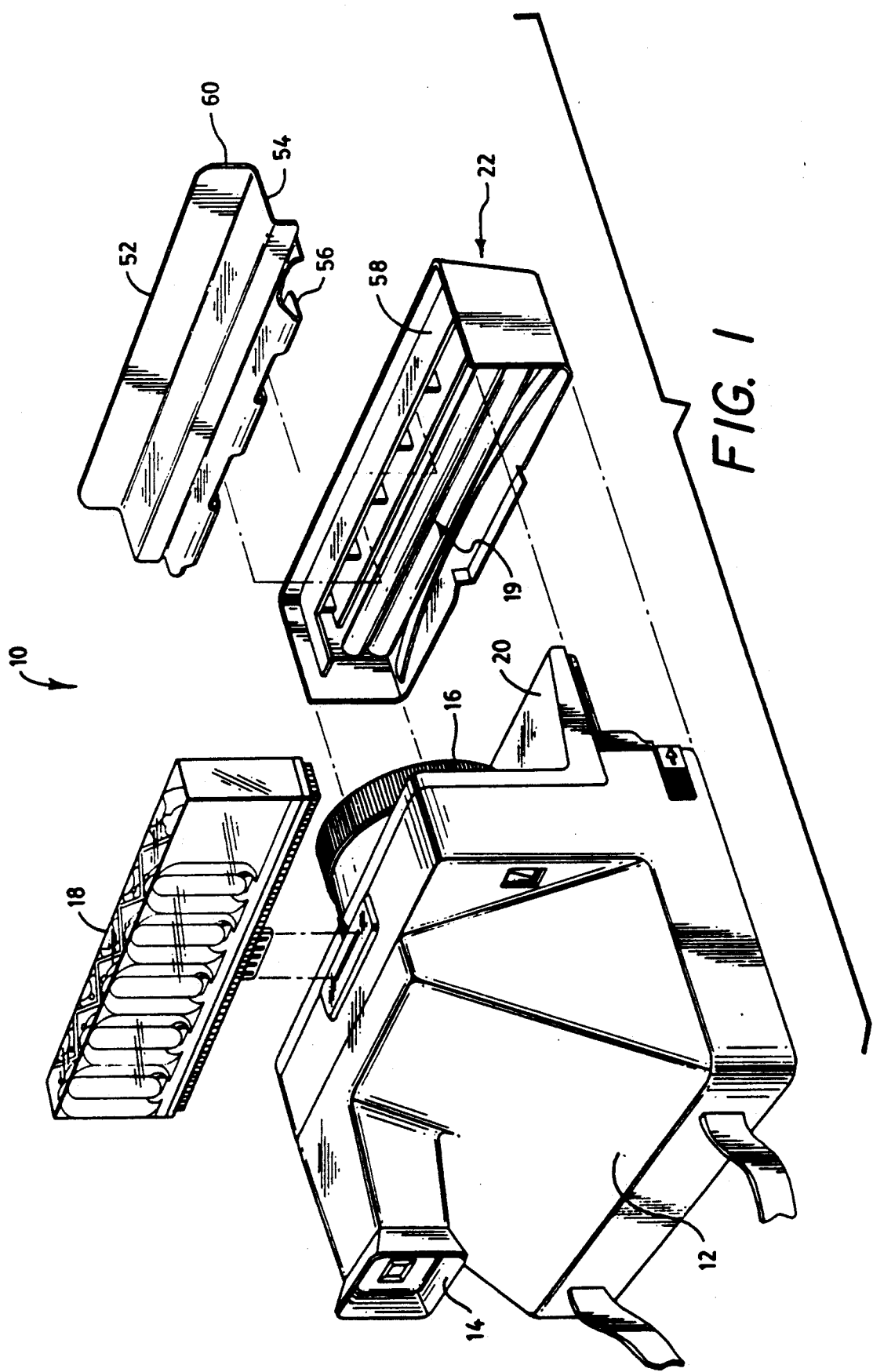
FIG. 1 is an exploded view of a self-developing or instant camera having a housing. a source of artificial light, a film pack loading door and a reflector to be mounted on the loading door.
Figure 2:
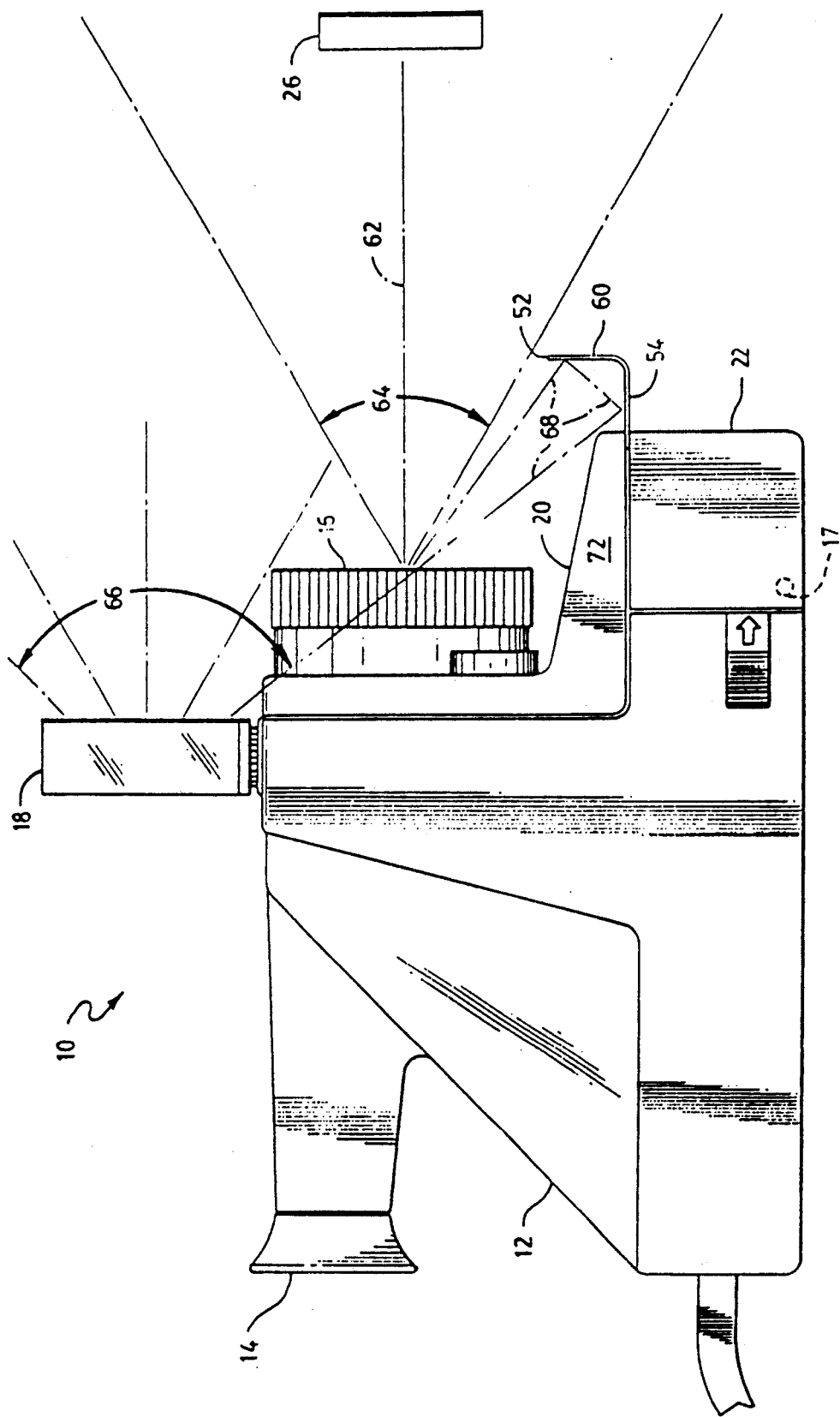
FIG. 2 is a side elevational view of the camera of FIG. 1 in assembled position.

Observing particularly FIGS. 1 and 2, a camera 10 includes a lighttight housing 12 having an eye piece 14 to the rear and an objective lens 16 on the front.

A conventional source of artificial light is shown mounted on the top of the camera, in this case a replaceable flash bar 18. A conventional strobe light could be substituted for the flash bar 18 if desired without departing from the inventive concept.

The lighttight housing 12 includes a forwardly extending apron 20 projecting below and beyond the forward edge of the lens 16. A film cassette loading door 22 includes a pair of laterally spaced hinges (not shown) for pivotally coupling it at 17 (FIG. 2) to the housing 12 for clockwise movement from its closed position (shown in FIG. 2) to a loading position. The loading door 22 carries a pair of superposed rollers 19 which are adapted to rupture a container of processing liquid located on an end of an exposed film unit and spread its contents between layers of the film unit to initiate the formation of a visible image therein while simultaneously advancing the film unit to the exterior of the camera 10. The camera 10 is of the type formerly manufactured by the Polaroid Corporation and sold under the trademark "Pronto!"

The internal parts of the camera within the housing are conventional and they are not shown. They will include a shutter which may be activated by an external trigger or button (not shown) on one side of the external surface of the housing. Activation of the camera in conventional manner by pressing the shutter button causes the source of artificial light 18 to flash and the shutter to open for a predetermined period of time. Light from the artificial source 18 travels to the object 26 to be photographed and light is reflected back from the object 26 through the objective lens 16 to a reflex mirror inside the camera housing and then onto the surface of a film unit.

Figure 3:
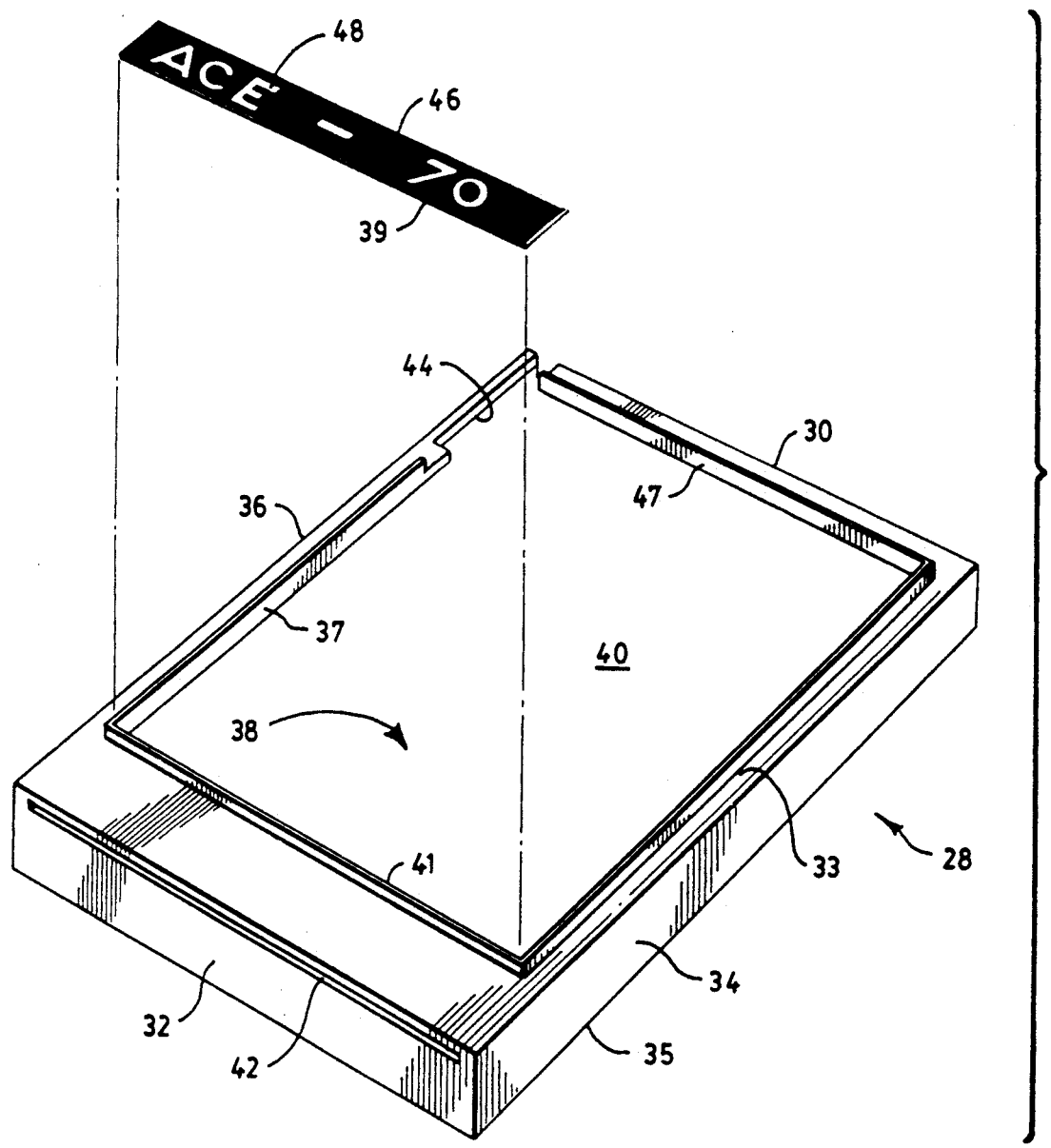
FIG. 3 is a prospective exploded view of a film cassette with a narrow template to be mounted in the housing of the film cassette.
Figure 4:
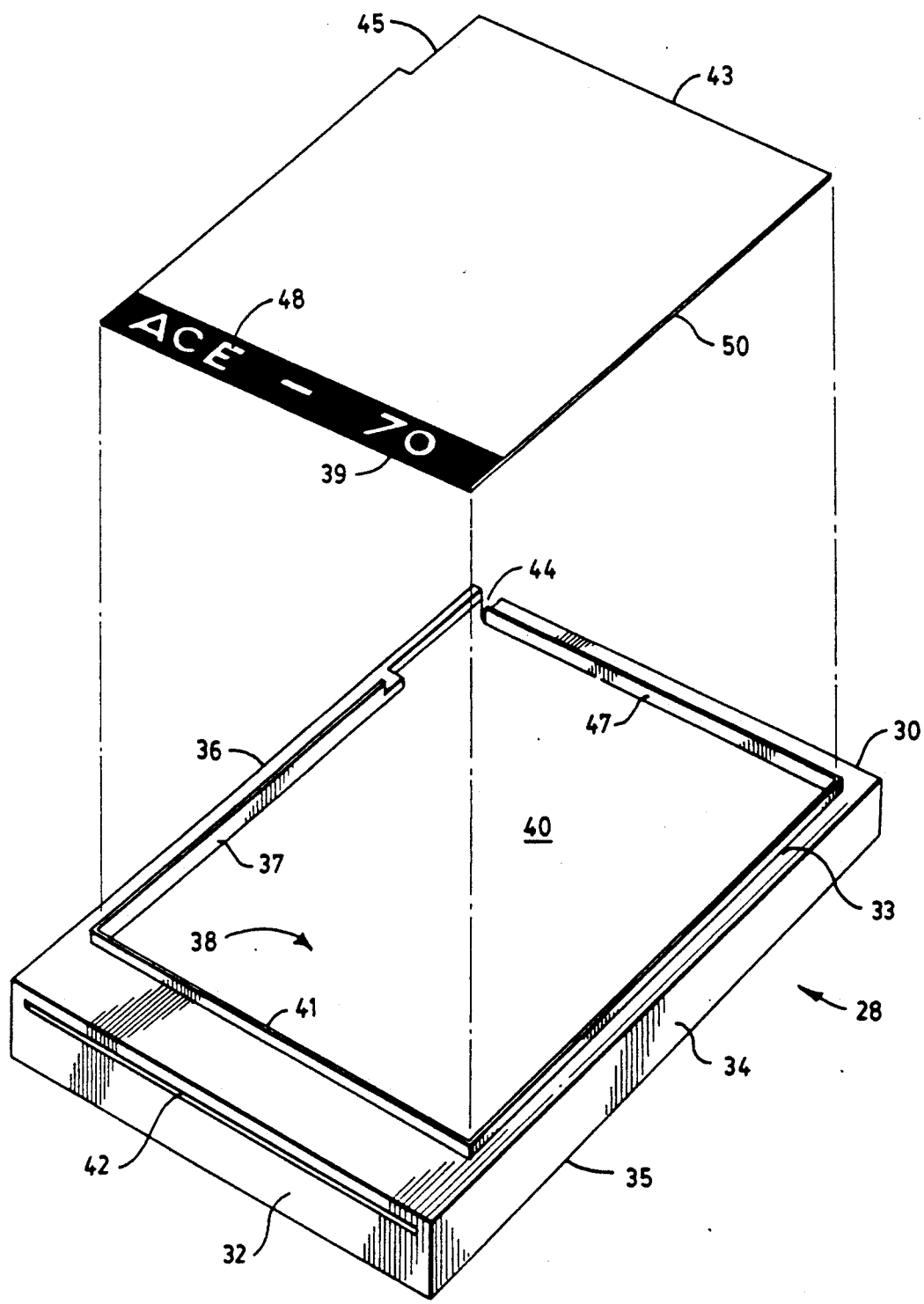
FIG. 4 is an exploded view of a film cassette and template similar to FIG. 3 but with a different structure for the template.

FIGS. 3 and 4 illustrate a conventional film cassette 28 including a generally rectangular frame having a trailing end wall 30, a leading end wall 32, side walls 34 and 36, and forward and rear walls 33 and 35, respectively. The forward wall 33, as seen in FIGS. 3 and 4, includes an upwardly extending flange or rib 37 which substantially defines four sides of an exposure aperture 38. The film cassette 28 includes a resilient platen which supports a stack of film units 40 in position to receive the reflected light from the mirror within the camera housing.

A slot 42 in the leading end wall 32 of the film cassette allows the uppermost film unit 40 to be ejected from the film cassette 28 by a pick (not shown) which may move longitudinally through a gap 44 in the trailing end wall 30 and the forward wall 33 and into engagement with a trailing edge of the exposed film unit. The pick is conventional and is initially used to remove a dark slide at the top of the stack of film units when the cassette is initially inserted into the camera housing and the loading door 22 closed. After the dark slide is removed, the uppermost film unit 40 is properly oriented in position within the cassette 28 to receive light via the exposure aperture 38.

In the embodiment of the invention shown in FIG. 3, the film cassette 28 is adapted to receive a template 46 along one edge of the exposure aperture 38. The template 46 is of a dark or opaque construction and includes a transparent or cutout portion 48, in this case an indicia reading ACE-70. The indicia 48 may be any particular designation including the name of the photographer, a trademark logo, a copyright notice or any other identifying mark. The particular indicia shown in FIGS. 3 and 4 is for illustrative purposes only.

Note, that the template in FIG. 3 is a single narrow strip which is to be mounted along one edge of the exposure aperture 38, while the same strip is shown in FIG. 4 as being attached to or formed integrally with a transparent sheet to define a larger template 50 which is dimensioned to fit within the exposure aperture 38 but out of alignment with the gap 44. The particular means for mounting the templates 46 and 50 within the film cassette 28 is not critical to this invention and any desirable means may be employed. For example, the template 46 may have a length substantially equal to, or slightly less than, the width of the exposure aperture 38, as measured between the sides 34 and 36 of the cassette 28. Longitudinal movement of the template 46 toward the cassette's leading end wall 32 as a result of any underlying element, e.g., a dark slide or film unit, being moved out of the cassette 28 via the slot 42 is precluded by the engagement between a leading edge 39 of the template and an adjacent edge 41 of the exposure aperture 38. When the template 46 is properly located within the exposure aperture 38, engagement between the ends of the template 46 and the adjacent vertical surfaces of the rib 37 will deter lateral movement of the template 46. As regard the template 50 in FIG. 4, its width is the same as the length of the previously described template 46 shown in FIG. 3. The longitudinal dimension of the template 50, as measured between its leading and trailing edges 39 and 43 is substantially equal to or slightly less than the corresponding distance between the laterally extending portion 41 of the rib 37 and the internal surface of the portion 47 of the rib 37, thus preventing relative longitudinal movement. The template 50 may also include a cutout 45 for providing additional clearance for the camera's pick or film advancing means.

Looking again to FIGS. 1 and 2, a reflector 52 of generally L-shaped configuration is mounted on the camera sandwiched between the loading door 22 and the apron 20. That is, a horizontal leg 54 of the reflector 52 includes a hook 56 on its free end which slides into place below a shelf 58 on the film pack loading door 22. Thereby, the reflector 52 will be locked into operative position with its vertically extending leg 60 extending upwardly generally perpendicular to axis 62 of the field of view 64 of the lens 16, but outside of said field of view. It will be noted that the field of illumination 66 of the source of artificial light 18 defines a much larger angle than the field of view 64 of the lens 16 and thus, some of the light from the flash 18 will impinge on and be reflected from the reflector 52 to the objective lens 16, as indicated generally by a line 68 illustrating one path for such light.

Experiments have been conducted both where the reflector 52 is located within the field of view 64 as in the aforementioned '176 patent and where it is outside the field of view 64. Superior results have been achieved when the reflector 52 is located outside the field of view 64. The reasons for the result are not fully understood.

Reflector 52 is coated with a finish which will diffuse any of the artificial light incident thereon during exposure. White gloss enamel paint has been found to provide adequate diffusion of the artificial light. It has been discovered that excellent results are obtained with white glass enamel paint but disappointing results are obtained with surfaces which provide for specular reflection rather than a diffused reflection.

Figure 5:
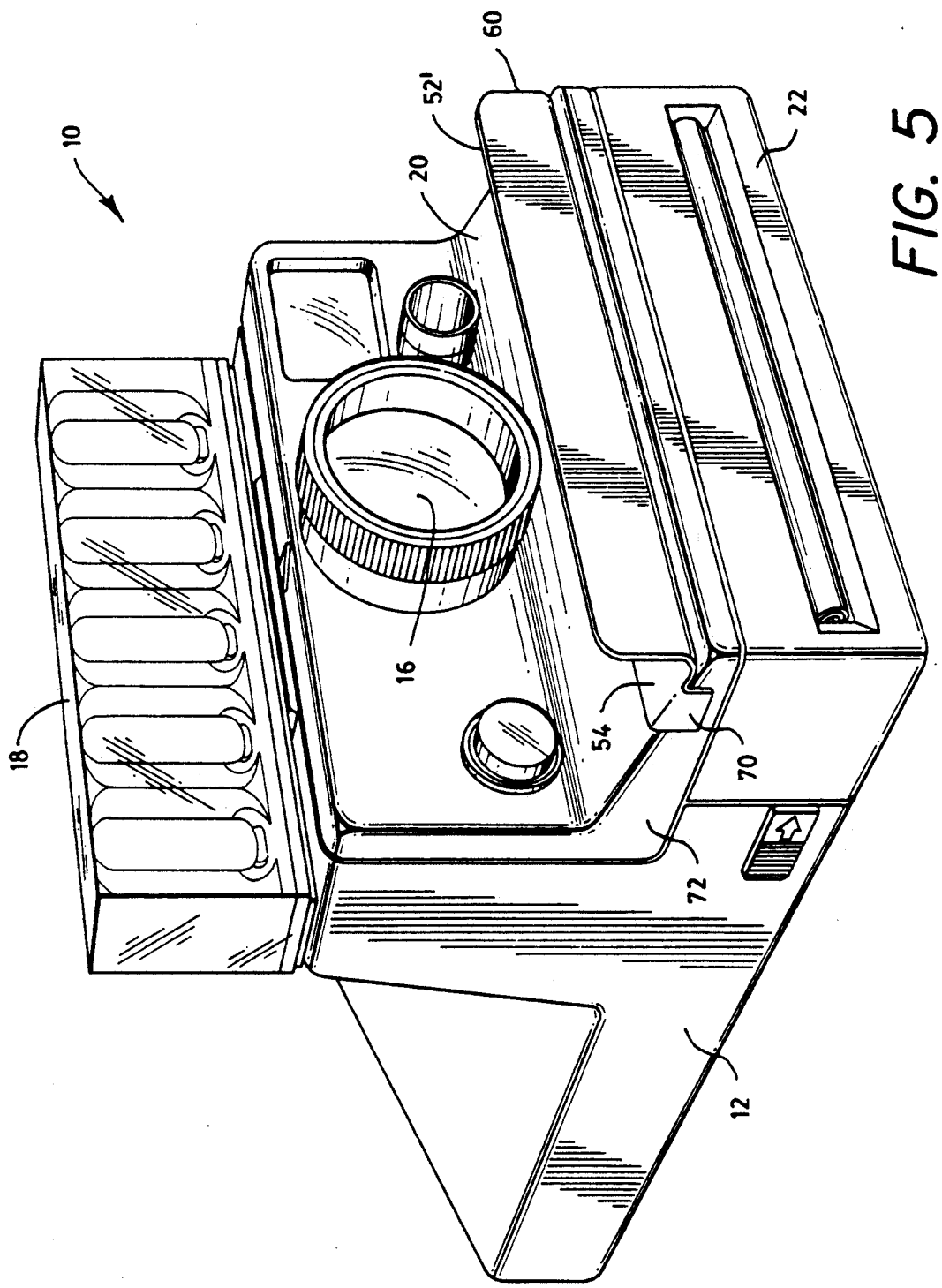
FIG. 5 is a prospective view of the camera of FIG. 1 but with an alternative embodiment of a reflector.

In operation, the film cassette 28 is inserted into the camera housing 12 through door 22 in conventional fashion and the dark slide (not shown) covering the first film unit 40 is automatically removed in conventional fashion upon the loading door 22 being closed. At such time as it is desirable to photograph an object 26, the object is viewed through the eye piece 14 and the shutter actuation button is depressed to trigger the opening of the shutter and to activate the flash unit 18. Light from the source of artificial light 18 and any natural light is reflected from the object 26 through the objective lens 16 to a mirror within the housing 12 and then to the film unit 40. Simultaneously, some of the artificial light from source 18 travels along, e.g., the path 68, to the reflector 52 and is reflected backwardly through the objective lens 16 to the top area of the mirror and then to the bottom end of the film unit 40 (left end as viewed in FIG. 3), thereby insuring that adequate illumination passes to the template 46 and through the indicia 48 to properly expose the film unit 40 underlying the template 46 such that the contrast with adjacent portions beneath the opaque portions of the template allows one to read the indicia as developed on the film unit 40. Note, this superposed indicia will appear at the bottom of the scene in the photograph when the camera 10 is held as shown in FIGS. 1, 2 and 5. Since this portion of the scene generally is the darkest insofar as it is usually the ground, the additional reflected light provided by the reflector 52 enhances the contrast between the indicia and the surrounding scene.

Looking now to FIG. 5, an alternative embodiment of an L-shaped reflector 52' is mounted on the apron 29 of the camera housing 12 by a different mechanism. The L-shaped reflector of the FIG. 5 embodiment includes the same horizontal leg 54 (although it may have a slight upward tilt to accommodate the angled apron) and the same vertical leg 60. However, it is attached to the camera housing by having depending flanges 70 spring-biased inwardly to grip the sides 72 of the apron. This particular embodiment allows the reflector unit 52' to be mounted on the camera housing without the necessity of opening the loading door 22. The flanges 70 merely provide a frictional grip for the reflector 52' on the sides of the apron and may be mounted or demounted by a simple hand operation.

In the embodiments illustrated, rays of light 68 from the reflector 52' enter the lens 16 at a location near the lens' top. Accordingly, the rays of light reflected from the internal mirror impinge with greatest intensity on the film unit 40 covered by the template 46 which, in the illustrated embodiments, is the lower part of the field of view 64 from the lens 16.

Since certain changes may be made in the above described apparatus without departing from the scope of the invention herein involved, it is intended that all matter contained in the above description or shown in the accompanying drawings shall be interpreted as illustrative and not in a limiting sense.

What is claimed:

1. A kit for use in adapting an instant camera to produce an exposed film unit having indicia imprinted along one end thereof during the exposure of the film unit, the camera including an objective lens having a field of view, a light source having a field of illumination which overlaps the field of view of the objective lens, and a housing for locating a film cassette containing a stack of film units in position for their sequential exposure via an exposure opening in a wall of the film cassette, said kit comprising:

a template having opaque portions which define indicia adapted to be reproduced on a film unit during its photographic exposure, said template being adapted to be located in superposition with an endmost film unit in this stack of film units in the film cassette; and a reflector having a reflecting surface and means for mounting said reflector on the camera at a location between the objective lens and a scene to be photographed with said reflecting surface facing toward the objective lens and the light source and being disposed outside of the field of view of the objective lens and within the field of illumination of the light source, whereby during the exposure of the scene a portion of the light from the light source is reflected by said reflecting surface back into the objective lens and then through said indicia and onto the film unit to supplement the scene light passing through the indicia thus recording the indicia on the end of the film unit with an intensity greater than that which would be produced by the reflected scene light alone.

2. A kit as defined in claim 1 wherein said reflecting surface is a light diffuser.

3. A kit as defined in claim 2 wherein said reflecting surface comprises a coating of white gloss enamel paint.

4. A kit as defined in claim 1 wherein said reflector mounting means is constructed to support said reflector on the camera with said reflecting surface in a plane substantially perpendicular to the axis of the objective lens.

5. A kit as defined in claim 4 wherein said reflector mounting means is constructed to frictionally maintain said reflector in position on the camera.

6. A kit as defined in claim 1 wherein said template is adapted to be located within the exposure opening in the film cassette and in contact with the film unit during its exposure.

7. A kit as defined in claim 6 wherein said template is dimensioned to cover only an end of the underlying film unit.

8. A kit as defined in claim 7 wherein said template has a longitudinal dimension substantially equal to a lateral width of the exposure aperture in the film cassette thus preventing lateral movement of said template relative to the film cassette.

9. A kit as defined in claim 6 wherein said template is dimensioned to substantially completely cover the area of the underlying film unit in which an image of the scene is to be reproduced.

10. A kit as defined in claim 9 wherein said template is planar and is dimensioned to duplicate the exposure aperture in the film unit whereby lateral and longitudinal movement of said template relative to the film cassette is substantially prevented.

* * * * *